United States Patent [19]

Iinuma et al.

[11] 4,150,573
[45] Apr. 24, 1979

[54] ELECTRONIC DIGITAL THERMOMETER

[75] Inventors: Kazuhiro Iinuma; Yukito Abe, both of Yokohama, Japan

[73] Assignee: Tokyo Shibaura Electric Co., Ltd., Japan

[21] Appl. No.: 856,995

[22] Filed: Dec. 2, 1977

[30] Foreign Application Priority Data

Dec. 3, 1976 [JP] Japan .............................. 51-144658
Feb. 22, 1977 [JP] Japan .............................. 52-18579

[51] Int. Cl.² .............................................. G01K 7/16
[52] U.S. Cl. .......................... 73/362 AR; 235/92 MT; 331/66
[58] Field of Search .................... 73/362 AR; 331/66; 235/92 MT

[56] References Cited

U.S. PATENT DOCUMENTS

| 3,872,728 | 3/1975 | Joyce et al. | 73/362 AR |
| 3,875,503 | 4/1975 | Hayashi | 73/362 AR |
| 3,890,841 | 6/1975 | Brixy | 73/362 AR |

Primary Examiner—Donald O. Woodiel
Attorney, Agent, or Firm—Finnegan, Henderson, Farabow & Garrett

[57] ABSTRACT

An electronic digital thermometer comprises a pulse oscillator to which a temperature-sensitive resistive element and a temperature-insensitive standard resistive element are alternately coupled as a frequency determining element, a temperature output circuit which is provided with a counter connected to the pulse oscillator and provides a measured temperature value, and a digital display device for displaying the measured temperature value. The temperature output circuit is so arranged that oscillation frequencies of the pulse oscillator respectively produced when the temperature-sensitive resistive element and the standard resistive element are coupled with the pulse oscillator are compared to calculate a measured temperature value.

25 Claims, 7 Drawing Figures

ASTABLE MULTIVIBRATOR 11

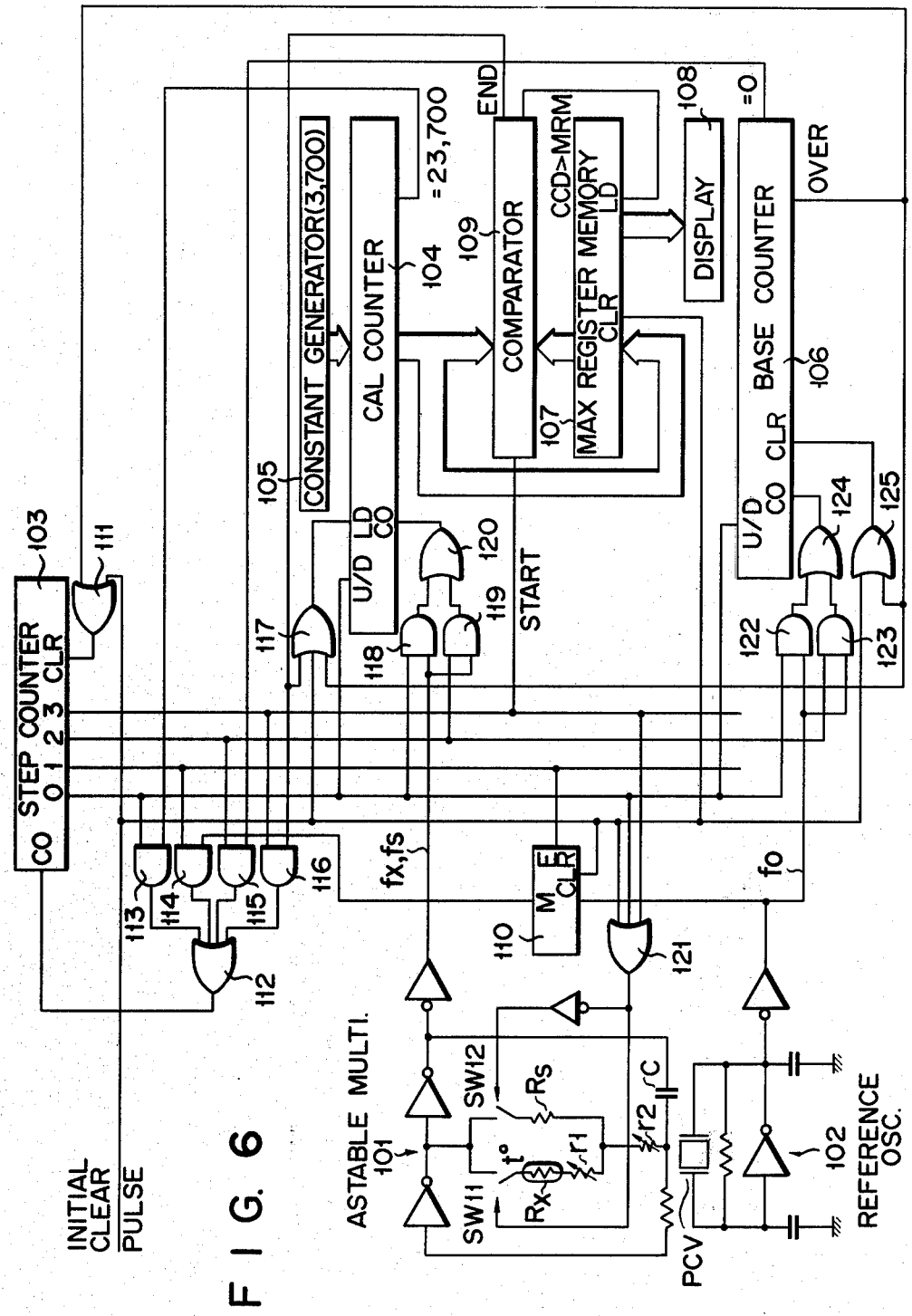
F I G. 6

ELECTRONIC DIGITAL THERMOMETER

BACKGROUND OF THE INVENTION

The present invention relates to an electronic digital thermometer for measuring temperature on the basis of the temperature dependence of the resistance value of a temperature-sensitive resistive element. More particularly, the invention relates to a digital thermometer for detecting temperature such as bodily temperature on the basis of an oscillating frequency change, due to temperature change, of an oscillator to which a temperature-sensitive resistive element is connected as a frequency determining element.

A typical prior art electronic thermometer comprises a pulse oscillator to which a temperature-sensitive resistor such as a thermistor is connected as a oscillation frequency determining element, a temperature output circuit including a counter connected to the pulse oscillator, a digital display device connected to the counter and a time decision circuit for applying the output pulses of the pulse oscillator to the counter during a predetermined time interval. The time decision circuit is arranged so as to supply pulses during one second of time interval to the counter. Accordingly, the counter counts the temperature-dependent oscillating frequency of the pulse oscillator and the digital display device displays a measured temperature value corresponding to the oscillating frequency. In this prior art, temperature is directly measured by the temperature-dependent oscillating frequency, and thus parts (passive elements) which have high accuracy and are little subject to ageing are required. In addition, with the prior art, it is difficult to correctly measure temperature due to possible variation in the oscillating frequency resulting from the variations in the power supply voltage and operating conditions of active elements used.

SUMMARY OF THE INVENTION

Accordingly, the object of the present invention is to provide an electronic digital temperature measuring device in which the need for high accuracy parts is eliminated and measuring errors due to oscillating frequency variation resulting from the variations in a power supply voltage and operating conditions of active elements are reduced.

According to the present invention, there is provided a temperature measuring device comprising oscillator means to which a temperature-sensitive resistive element and a temperature-insensitive resistive element are alternately coupled as a frequency determining element to produce a temperature-dependent frequency $f_x$ and a temperature-independent frequency $f_s$ alternately; and temperature output circuit means coupled to the oscillator means for providing a measured temperature value T on the basis of a equation defined by $$T = T_0 + \frac{1}{\alpha} \cdot \frac{f_x - f_s}{f_x} \text{ or } T_0 + \frac{1}{\alpha} \cdot \frac{f_x - f_s}{f_s}$$

where $T_0$ = predetermined reference temperature
$\alpha$ = temperature coefficient of the temperature-sensitive resistive element.

The present invention will be better understood from the following description taken in connection with the accompanying drawings, in which:

BRIEF DESCRIPTION OF THE DRAWINGS

FIG. 6 shows a block diagram of still another embodiment of the temperature measuring device of the invention.

DETAILED DESCRIPTION OF THE PREFERRED EMBODIMENTS

Figure 1:
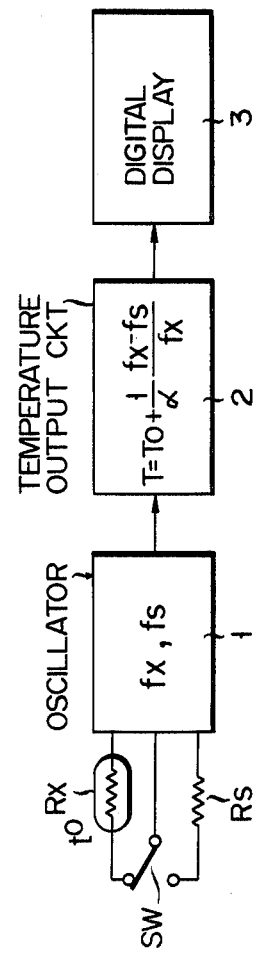
FIG. 1 is a schematic block diagram for explanation of the principle of temperature measurement according to this invention.
Figure 3:
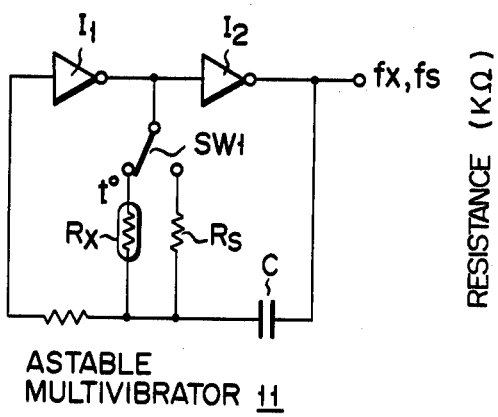
FIG. 3 shows an example of an astable multivibrator which may be used as a temperature-frequency converting pulse oscillator of the temperature measuring device of the invention.

In FIG. 1 showing a basic arrangement of this invention, reference numeral 1 is a pulse oscillator such as the astable multivibrator shown in FIG. 3 to which a temperature-sensitive resistor or thermistor $R_x$ and a temperature insensitive standard resistor $R_s$ are alternately coupled as a frequency determining element to produce a temperature-dependent frequency $f_x$ and a temperature-independent frequency $f_s$, 2 an arithmetic unit or temperature output circuit, and 3 a digital display.

The following description is the principle of the temperature measurement according to the invention.

In the astable multivibrator as shown in FIG. 3, the oscillating frequency $f_x$ when the thermistor $R_x$ is connected is $$f_x = k/R_x \cdot C \tag{1}$$

When the standard resistor such as a metal film resistor $R_s$ is connected, the oscillating frequency is $$f_s = k/R_s \cdot C \tag{2}$$

In the equations (1) and (2), k is a proportional constant. The resistance value of the thermistor $R_x$ at a reference temperature $T_0$, for example, 37° C. is set to be substantially equal to that of the standard element $R_s$.

Figure 4:
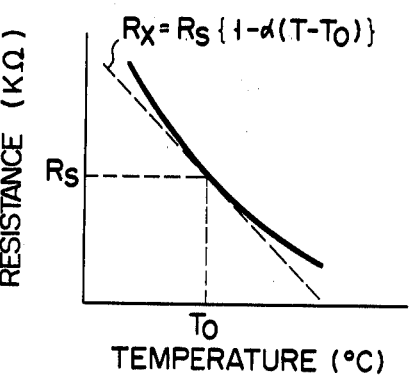
FIG. 4 is a graph illustrating the characteristic of a thermistor as a temperature-sensitive resistive element.

The temperature-resistance characteristic of the thermistor is generally plotted as indicated by a solid line in FIG. 4. Bodily temperature generally is in a relatively narrow range from 35° to 42° C. In this temperature range, the characteristic of $R_x$ may be considered to be almost linear as indicated by a dashed line in the figure. Accordingly, the resistance value of thermistor can be represented as follows:

$$R_x = R_s \{1 - \alpha(T - T_0)\} \tag{3}$$

where $\alpha$ is a constant representing a temperature coefficient of the thermistor. From the equations (1) and (2), the following equation results $$f_x/f_s = R_s/R_x \tag{4}$$

The equations (3) and (4) yields $$T = T_0 + \frac{1}{\alpha} \cdot \frac{f_x - f_s}{f_x} \tag{5}$$

Accordingly, temperature of thermistor $R_x$ can be provided by the arithmetic unit 2 which performs the predetermined arithmetic operation on the basis of the equation (5). Since the measured values depend only on the ratio between $f_x$ and $f_s$, highly accurate measured values can be obtained. The electronic temperature measurement device according to the present invention is particularly suitable for a clinical thermometer. The thermistor $R_x$ is housed in a sensor of the clinical thermometer. The sensor and the thermometer body are connected with lead wires. The switching between the resistive elements $R_x$ and $R_s$ are electronically performed within a short time interval.

Figure 2:
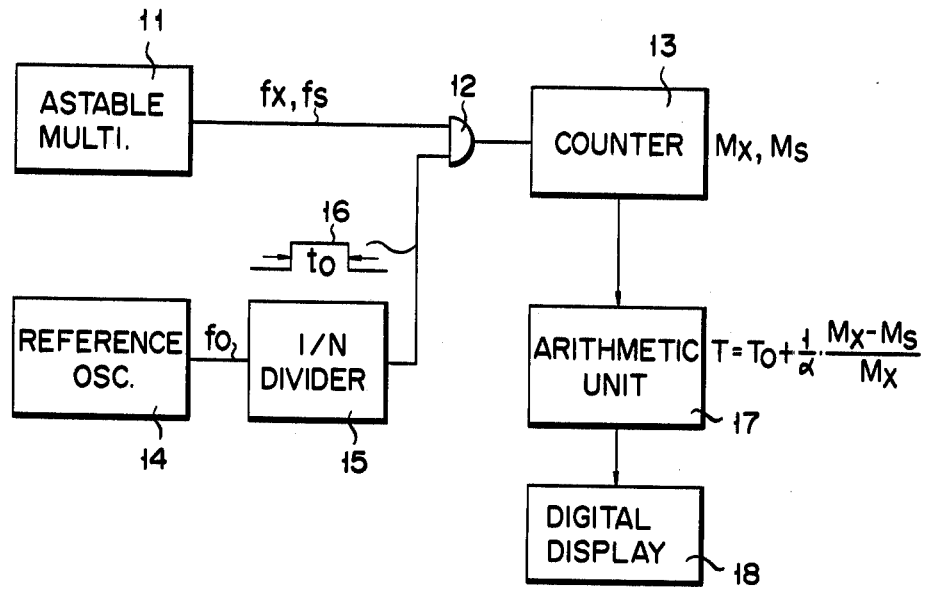
FIG. 2 shows a block diagram of an embodiment of an electronic temperature measuring device according to the invention.

In a practical embodiment of the invention schematically shown in FIG. 2, reference numeral 11 designates a temperature-to-frequency converting pulse oscillator such as an astable multivibrator. As described before, to the pulse oscillator 11 a temperature-sensitive resistive element $R_x$ such as a thermistor and a standard resistive element $R_s$ such as a metal film resistor which is substantially insensitive to temperature are alternately coupled as a frequency determining element, to cause the oscillator to produce alternately pulse trains with a temperature-dependent frequency $f_x$ and a temperature-independent standard frequency $f_s$. The output pulse trains of $f_x$ and $f_s$ of the pulse oscillator 11 are alternately applied to a counter 13 through an AND gate 12 during a given time interval $t_0$. For this purpose, a reference pulse oscillator 14 for generating a pulse train with a frequency $f_0$ and a 1/N frequency divider 15 are provided. The 1/N frequency divider 15 frequency-divides the output pulse from the oscillator 14 by N to produce a reference time signal 16 with a duration of $t_0(=N/f_0)$. The AND gate 12 is enabled by the reference time signal 16 to permit the output pulses of the astable multivibrator 11 to pass to the counter 13 during the time interval $t_0$. The counter 13 counts the $f_x$ pulse train during the time interval $t_0$ and the $f_s$ pulse train during the same time interval, alternately. The count values of the counter 13 are applied to an arithmetic unit 17. The arithmetic unit 17 calculates measured temperature in accordance with a given equation by using the numbers of pulses of $f_s$ and $f_x$ which have been counted by the counter 13 during the same time interval $t_0$. The calculated temperature is displayed by a digital display 18.

The astable multivibrator 11 may be arranged, for example, as shown in FIG. 3. In the figure, $I_1$ and $I_2$ are CMOS inverters, $SW_1$ a switch for alternately connecting the temperature-sensitive resistive element or thermistor $R_x$ and the standard resistive element $R_s$ to the oscillator, and C a capacitor which is another frequency determining element. When the resistor $R_x$ is connected to the astable multivibrator, the counting value $M_x$ of the counter 13 is $$M_x = f_x \cdot t_0 = \frac{f_x}{f_0} \cdot N \tag{6}$$

When the resistor $R_s$ is coupled with the astable multivibrator, the count value $M_s$ is $$M_s = f_s \cdot t_0 = \frac{f_s}{f_0} \cdot N \tag{7}$$

Substituting (6) and (7) into (5) yields $$T = T_0 + \frac{1}{\alpha} \cdot \frac{M_x - M_s}{M_x} \tag{8}$$

As seen, the equation (8) includes the previously known reference temperature $T_0$ (for example, 37° C.), the temperature coefficient $\alpha$ of the thermistor (for example, $5 \times 10^{-3}$/deg), and two counting values $M_x$ and $M_s$ of the counter 13. The arithmetic unit 17 calculates the equation (8) which is a modification of the equation (5) to find the measured temperature value to be applied to the display device 18 for visual indication.

As seen from the equation (8), the arithmetic unit 17 in the embodiment in FIG. 2 needs an operation of division. Another embodiment of the present invention enables to calculate a temperature by using a simple arithmetic operation.

Note here that the time interval $t_0$ during which output pulses of the astable multivibrator 11 are counted must be within the time interval permitting the T to be calculated with a satisfactory accuracy in accordance with the equation (8). The temperature T may be calculated by the number $M_s$ of pulses with the frequency $f_s$ counted during the same time interval as a time interval $t (= 10^n/\alpha \cdot f_x)$ during which the given number $(10^n/\alpha)$ of pulses having the frequency $f_x$ is to be counted. Substituting $M_x = 10^n/\alpha$ into (8) yields $$T = T_0 + 10^{-n}(M_x - M_s) = 10^{-n}\{10^n T_0 + (M_x - M_s)\} \tag{9}$$

In the equation (9), assuming that $n = 2$, $T_0 = 37.00°$ C. and $M_x = 20,000$ ($\alpha = 5 \times 10^{-3}$), the temperature T is obtained as follows $$T = (23,700 - M_s)/100 \tag{10}$$

This equation shows that the temperature T may be obtained by merely subtracting the number $M_s$ of pulses with $f_s$ within the time interval $t_0 = 10^2/\alpha \cdot f_x$ from the given number of 23,700. For example, when the standard resistor $R_s$ and the thermistor $R_x$ are connected with the astable multivibrator with the oscillating frequencies 200.00 KHz for $f_s$ and 199.56 KHz for $f_x$, $t_0 = 100.22$ ms and $M_s = 20044$. Therefore, $T = 36.56°$ C. is obtained from the equation (10). In practice, the arithmetic circuit is only required to calculate $23,700 - M_s$ and feed the result of subtraction, 3656, to a four-digit numerical display device including a decoder driver.

An example embodying the concept of the invention to obtain the measured temperature through such the subtractive operation as described above is shown in FIG. 5. As shown, this embodiment is provided with a counter 19 which produces a "1" level output upon completion of counting $10^n/\alpha$ (e.g. 20,000) output pulses with the temperature-dependent frequency $f_x$ from the astable multivibrator when the thermistor $R_x$ is connected to the astable multivibrator 11, and an up-down counter 20 in which the output pulses with the reference frequency $f_0$ of the reference frequency oscillator 14 are counted to detect the time interval that the counter 19 counts the $10^n/\alpha$ output pulses of $f_x$ and thereby to determine the time interval that the counter 13 counts the output pulses of $f_s$.

There are further provided flip-flop circuits 21 and 22, an inverter 23, AND gates 24 to 27, and a switch $SW_2$ gauged with the switch $SW_1$ in the astable multivibrator 11 and applying control signals to the flip-flop circuits 21 and 22 so that, when the thermistor $R_x$ is connected to the astable multivibrator, the counter 19 counts the temperature-dependent $f_x$ output pulses of the multivibrator, and the up-down counter 20 is counted up by the output pulses of the reference oscillator 14, and, when the standard resistor $R_s$ is connected to the multivibrator, the counter 13 connected to the arithmetic circuit 17 counts the standard output pulses of $f_s$ from the multivibrator and the up-down counter 20 is counted down by the reference output pulses of the reference oscillator 14.

In operation, when the thermistor $R_x$ is coupled with the astable multivibrator 11 through the switch $SW_1$, the switch $SW_2$ permits a "1" level signal to be applied to the reset terminal R of the flip-flop circuit 21, and a "0" level signal to be applied to the reset terminal of another flip-flop circuit 22 through the inverter 23. Accordingly, the AND gate 25 connected to the input of counter 19 and AND gate 26 connected to the up-count input U of the up-down counter 20 are enabled by reset output $\bar{Q}$ ("1") of the flip-flop circuit 21. On the other hand, the AND gates 24 and 27 are disabled by reset output $\bar{Q}$ ("0") of the flip-flop circuit 22. As a consequence, output pulses of $f_x$ of the astable multivibrator 11 is counted by the counter 19 and the up-down counter 20 is counted up by output pulses of the reference oscillator 14 from the initial value, for example, 0. When counting $10^n/\alpha$ pulses, the counter 19 produces a "1" level output to set the flip-flop circuit 21. As a result, the AND gates 25 and 26 are disabled, thereby stopping the counting operation of the counters 19 and 20.

Then, when the standard resistor $R_s$ is coupled with the astable multivibrator, the flip-flop circuit 22 is set to produce at the output $\bar{Q}$ "1" which in turn enables the AND gates 24 and 27. As a result, the output pulses of $f_s$ are counted by the counter 13 and the output pulses of the reference oscillator 14 causes the counter 20 to be counted down to 0. When the content of the up-down counter 20 becomes 0, the flip-flop circuit 22 is set to disable the AND gates 24 and 27 and then to stop the counting operations of the counters 13 and 20. The count-up time of the up-down counter 20 from 0 is equal to the count-down time thereof to 0. Accordingly, the time interval during which the counter 13 counts the output pulses of $f_s$ equals the time interval during which the counter 19 counts $10^n/\alpha$ pulses with frequency $f_x$. Therefore, as described above, the arithmetic unit 17 may calculate the temperature T by using temperature-dependent value $M_s$, predetermined reference temperature $T_0$, and given value $M_x$ ($10^n/\alpha$ to be counted by the counter 19 in accordance with the equation $T = 10^{-n}(10^n T_0 + M_x - M_s)$ which is a modification of the equation (5).

Figure 5:
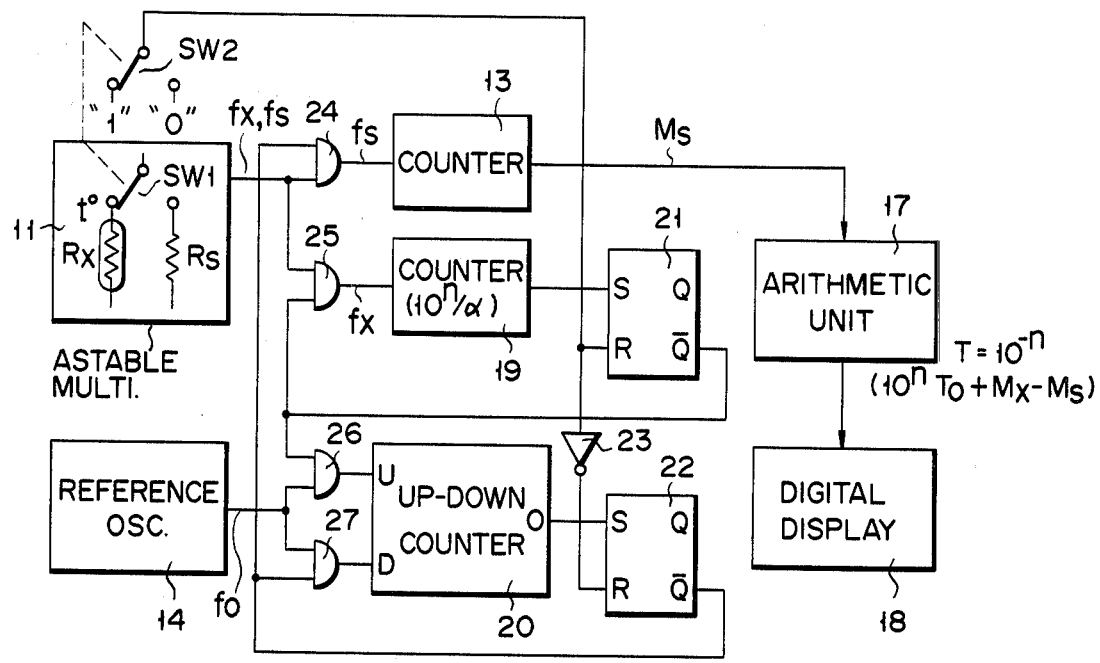
FIG. 5 shows a block diagram of another embodiment of the temperature measuring device of the invention.

The embodiment of FIG. 5 needs two counters for counting the output pulses of the astable multivibrator and an arithmetic circuit. As seen from the relation $T = 10^{-n}(10^n T_0 + M_x - M_s)$, the counting and arithmetic operation may be performed by the use of a single up-down counter. An example of such is shown in FIG. 6.

The embodiment of FIG. 6 are comprised of a temperature-frequency converting oscillator or astable multivibrator 101, reference oscillator 102, step counter 103 of a 2-bit ring counter, calculation up-down counter 104 for counting output pulses of the oscillator 101 to produce a measured temperature value, constant generator 105 for presetting a given initial value in the counter 104, up-down counter or base counter 106 for counting output pulses of the reference oscillator 102 to determine the counting time of the counter 104, a maximum register memory 107 for memorizing the maximum value of the counter 104, digital display 108 connected to the register memory 107 to display the maximum value of the measured temperature value, comparator 109 for comparing the contents of the memory 107 and of the counter 104, counter 110 for producing "1" output when M output pulses of the reference oscillator 102 are counted, and logical gates 111 to 125.

In the FIG. 6 circuit, when a power switch (not shown) is turned on, an initial clear pulse is produced. The initial clear pulse is applied through the OR gate 111 to the CLEAR terminal CLR of the step counter 103; through the OR gate 125 to the CLEAR terminal CLR of the base counter 106; directly to the CLEAR terminals CLR of the register memory 107 and the counter 110. The initial clear pulse is also applied through the OR gate 117 to the LOAD terminal LD of the counter 104 with the result that a given constant, for example 3,700 is loaded from the constant generator 105 to the counter 104. The initial pulse is further applied to the astable multivibrator 101 via the OR gate 121 to close an electronic switch $SW_{11}$ for connecting the thermistor $R_x$ to the astable multivibrator. At this time, another switch $SW_{12}$ connected to the standard register $R_s$ opens. The oscillator 101 starts, therefore, to oscillate at a frequency dependent on the resistance of the thermistor $R_x$ and the reference oscillator 102 also oscillates at the reference frequency $f_0$.

When the initial clear pulse disappears, 0 output of the step counter 103 is rendered high in level to start STEP 0 operation. In the STEP 0, the AND gates 118 and 122 are both enabled and the up-down control terminals U/D of the counters 104 and 106 are at high level so that these counters operate as up-counters for pulses appearing at CLOCK terminals CO. The counter 104 counts the pulse of $f_x$ incoming through the AND gate 118 and the OR gate 120 from the preset initial value 3,700 corresponding to the reference temperature $T_0$ (37° C.) up to 23,700. When the count value of the counter 104 reaches 23,700, the counter 104 produces "1." The counter 106 counts pulses with frequency $f_0$ incoming through the AND gates 122 and 124. At the time the counter 104 produces "1," a pulse is applied to the CLOCK terminal CO of the step counter 103 via the AND gate 113 and OR gate 112 so that 1 output of the step counter 103 becomes high level to initiate STEP 1 operation. In STEP 1, counters 104 and 106 stop their counting operations, and the output of the OR gate 121 is "0" so that the switch $SW_{11}$ is opened and the switch $SW_{12}$ is closed. Further, the counter 110 is enabled by a "1" signal applied to the ENABLE terminal E to produce a "1" output after about 9 msec. when the frequency of the reference oscillator 102 is 445 KHz, i.e. after 4,000 counts. The content of the step counter 103 is incremented by 1, upon receipt of the output of the counter 110, resulting in initiation of STEP 2. STEP 1 is intended to stop the operations of counters 104 and 106 during switching time between thermistor $R_x$ and standard resistor $R_s$. In STEP 2, the AND gates 119 and 123 are enabled and the U/D terminals of the counters 104 and 106 are at low level. Accordingly, the content of the counter 104 is counted down from 23,700 in response to clock pulses with frequency $f_s$ fed through the AND gates 119 and the OR gate 120. At the same time, the contents of the counter 106 is counted down from the count value obtained by the preceding up-count operation, in response to clock pulses of $f_0$ fed through the AND gate 123 and the OR gate 124. The counter 106 produces "1" output when the content thereof returns to the initial value 0 which in turn is applied to the step counter through the AND gate 115 and the OR gate 112, resulting in initiation of SETP 3. In STEP 3, the AND gates 118, 119, 122 and 123 are disabled to cease the operations of the counters 104 and 106. At this time, the content of the counter 104 is 23,700-$M_s$. In STEP 3, switching between the thermistor $R_x$ and the standard resistor $R_s$ is performed and the comparator 109 starts to operate in response to a START signal, or 3 output of the step counter 103. The comparator 109 compares the content of the counter 104 with the content of the memory 107. In the comparison, when the content of the counter 104 is larger than the content of the memory 107, that is when CCD>MRM, a signal is applied to the LOAD terminal LD of the memory 107 to load the content of the counter 104 into the memory 107. Due to the memory 107, the maximum value of the measured temperature is memorized as in the case of a mercury clinical thermometer and displayed by the digital display device 108. After completion of the comparing operation of the comparator 109, an END signal is fed to the step counter 103 through the AND gate 116 and the OR gate 112 and also to the LOAD terminal of the counter 104 through the OR gate 117. As a result, the step state returns to STEP 0 and the initial value (3,700) is again loaded into the counter 104. Thus far described step cycles will be repeated by the step counter and the temperature display remains unchanged as far as the measured temperature does not rise.

When the FIG. 6 embodiment is designed for a clinical thermometer, if temperature being measured is below the ordinary bodily temperature range (35° C.-42° C.), the content of the counter 106 possibly exceeds the maximum count value which is countable by the counter 106 before the counter 104 counts its maximum count value (23,700). In such a case, the system may be so designed that the counter 106 produces an OVER output to clear the counter 106 per se and the step counter 103, and to load the constant 3,700 into the counter 104.

The electronic thermometer according to the present invention is suitable for integrated circuit version by means of CMOS transistor and thus the thermometer can be made very small and batteries are preferable for the power source. As described above, temperature can be measured within a short time interval by comparing the frequencies $f_x$ and $f_s$ respectively produced when the thermistor $R_x$ and the standard resistor $R_s$ are connected to the pulse oscillator. Measurement errors resulting from variation in the oscillating frequency due to variation of the power supply voltage are remarkably reduced, compared to that of the conventional one directly detecting the frequency $f_x$. Additionally, parts with high accuracy are not necessarily needed. A high stability of frequency over a long interval of time is not required for the reference oscillator 102 so that an inexpensive piezoelectric ceramic vibrator PCV suffices for the vibrator.

As seen from the equation (3), it is desirable that, at the reference temperature $T_O$, the thermistor $R_x$ have a given resistance value (for example, 10 KΩ) and a given temperature coefficient $\alpha$ (for example, $5 \times 10^{-3}$). As a matter of fact, however, thermistors of the same type have variations in the resistance value and the temperature coefficient, due to the manufacturing process. It is thus difficult to prepare thermistors with desired resistance and temperature coefficient. This problem is solved by connecting a first variable resistor $r_1$ is series with the thermistor $R_x$ and a second variable resistor $r_2$ in series with a parallel circuit of the thermistor $R_x$ and the standard resistor $R_s$ as shown in FIG. 6. The first resistor $r_1$ is used to compensate for the resistance value of the thermistor $R_x$ and the second resistor $r_2$ to compensate for the temperature coefficient $\alpha$.

A general expression for the thermistors having variations in the resistance value and temperature coefficient is given by $$R_x = R_{TO}\{1-\alpha_O(T-T_O)\} \tag{11}$$

For example, $R_{TO} = 9.90$ KΩ and $\alpha_O$ is $5.15 \times 10^{-3}$. From the equation (11), measured temperature is given by $$T = T_0 + \frac{1}{\alpha_0}(1 - \frac{R_x}{R_{TO}}) \tag{12}$$

The equation (12) indicates that, unlike $$T = T_0 + \frac{1}{\alpha}(1 - \frac{R_x}{R_s})$$

derived from the equation (3), the above-mentioned embodiment using only the thermistor $R_x$ and standard resistor $R_s$ fail to perform a correct measurement of temperature when thermistors of $R_{TO} \neq R_s$ and $\alpha_O \neq \alpha$ are used.

When the oscillator of FIG. 6 is used, measured temperature T is expressed by $$T = T_0 + \frac{1}{\alpha}(1 - \frac{R_x + r_1 + r_2}{R_s + r_2}) \tag{13}$$

If the resistors $r_1$ and $R_2$ are adjusted as follows $$\left.\begin{array}{l} r_1 = R_s - R_{TO} \\ r_2 = \frac{\alpha_0}{\alpha} R_{TO} - R_s \end{array}\right\} \tag{14}$$

the equation (13) is changed into $$T = T_0 + \frac{1}{\alpha_0}(1 - \frac{R_x}{R_{TO}}) \tag{15}$$

This implies that, even if the thermistor having the characteristic given by the equation (11) is used, the temperature measurement device may be calibrated so as to correctly measure the temperature by properly adjusting the resistors $r_1$ and $r_2$.

Figure 7:
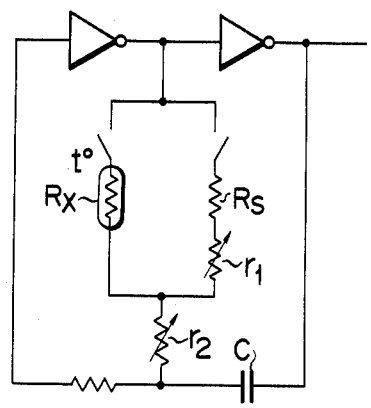
FIG. 7 shows a modification of the astable multivibrator shown in FIG. 6.

Practically, the sensor of the measurement device is placed in a thermostatic chamber and the temperature in the chamber is adjusted to the reference temperature $T_O$. At this time, the temperature indication is set $T_O$ by adjusting the first variable resistor $r_1$, and then thermostatic chamber temperature is adjusted to be $T_1$ ($\neq T_O$). Following this, the second variable resistor $r_2$ is adjusted so that the temperature indication reads $T_1$. After this adjustment, resistances of the first and second variable resistors $r_1$ and $r_2$ will satisfy the relations in the equation (14). Alternatively, the first resistor $r_1$ may be connected in series with the standard resistor $R_s$, as shown in FIG. 7.

This invention is not limited to the above embodiments so long as the temperature output circuit measures temperatures on the basis of the equation (5). Generally, where the count number of $f_O$ pulses is $N_x$ when the count number of $f_x$ pulses is $M_x$ (counting time $t_x$), and the count number of $f_O$ pulses is $N_s$ when the count number of $f_s$ pulses is $M_s$ (counting time $t_s$), the following equations will result.

$$M_x = f_x \cdot t_x \brace M_s = f_s \cdot t_s \qquad (16)$$

$$N_x = f_0 \cdot t_x \brace N_s = f_0 \cdot t_s \qquad (17)$$

If $M_x = M_s$, the equation (5) can be modified using the equations (16) and (17) as follows:

$$T = T_0 + \frac{1}{\alpha} \cdot \frac{N_s - N_x}{N_s} \qquad (18)$$

It will be understood that temperature can be measured on the basis of the equation (18). For example, in order for the embodiment of FIG. 6 to measure temperature on the basis of the equation (18), the embodiment may be modified such that the $f_O$ pulses of the reference oscillator 102 are applied to the counter 104 and the output pulses of the astable multivibrator 101 are applied to the counter 106.

Further, the temperature characteristic of thermistor in FIG. 4 may be represented approximately as follows:

$$R_x = \frac{R_s}{1 + \alpha(T - T_0)} \qquad (19)$$

In this case, the following equation will result.

$$T = T_0 + \frac{1}{\alpha} \cdot \frac{f_x - f_s}{f_s} \qquad (20)$$

The temperature output circuit may measure temperature on the basis of the equation (20).

Although the above explanation on the embodiments of this invention was made with reference to centigrade or Celsius thermometers, the thermometer according to this invention may be designed for Fahrenheit thermometers.

What we claim is:

1. A temperature measuring device comprising oscillator means to which a temperature-sensitive resistive element and a temperature-insensitive resistive element are alternately coupled as a frequency determining element to produce a temperature-dependent frequency $f_x$ and a temperature-independent frequency $f_s$ alternately; and temperature output circuit means coupled to said oscillator means for providing a measured temperature value T on the basis of an equation defined by $$T = T_0 + \frac{1}{\alpha} \cdot \frac{f_x - f_s}{f_x} \text{ or } T_0 + \frac{1}{\alpha} \cdot \frac{f_x - f_s}{f_s}$$

where
$T_O$ = predetermined reference temperature
$\alpha$ = temperature coefficient of said temperature-sensitive resistive element.

2. The electronic temperature measuring device according to claim 1, in which said pulse oscillator includes a first calibration resistor connected in series to said temperature-sensitive resistive element and a second calibration resistive element connected in series to both said temperature-sensitive resistive element and said standard resistive element.

3. The electronic temperature measuring device according to claim 1, in which said pulse oscillator includes a first calibration resistive element connected in series only to said standard resistive element and a second calibration resistive element connected in series to both said temperature-sensitive resistive element and said standard resistive element.

4. The temperature measuring device according to claim 1 in which said oscillator means includes an astable multivibrator.

5. The temperature measuring device according to claim 4 in which said astable multivibrator includes serially connected first and second inverters.

6. An electronic temperature measuring device comprising a pulse oscillator including a temperature-sensitive resistive element as a frequency determining element, a temperature output circuit having a counter connected to said pulse oscillator to count output pulses of said oscillator during a given time interval for providing a measured temperature value on the basis of pulse number counted during the given time interval, and a time decision circuit for deciding the pulse counting time of said counter, characterized in that: said oscillator is so arranged that the temperature-sensitive resistive element and a standard resistive element which is substantially insensitive to temperature are alternately coupled to said oscillator as a frequency determining element; said temperature output circuit is so arranged that said counter counts, during the time interval decided by said time decision circuit, pulses produced when at least said standard resistive element is coupled with said pulse oscillator, and a measured temperature value provided by said temperature output circuit is functionally related to the numbers of pulses counted by said counter during the time interval decided by said time decision circuit.

7. The electronic temperature measuring device according to claim 6, in which said counter of said temperature output circuit is an up-down counter which is counted up by first output pulses of said pulse oscillator from an initial value to a given value when said temperature-sensitive resistive element is coupled with said pulse oscillator, and counted down by second output pulses of said pulse oscillator when said standard resistive element is connected thereto, during the time interval in which said counter is counted up by said first output pulses from the initial value to the given value, whereby a measured temperature value is provided by the content of said counter.

8. The electronic temperature measuring device according to claim 6, in which said time decision circuit comprises a reference oscillator, means connected to said reference oscillator for producing an enabling output pulse with a given duration, and an AND gate connected between the output of said pulse oscillator and said counter of said temperature output circuit and enabled by said enabling pulse to permit application of the output pulses of said oscillator to said counter.

9. The electronic temperature measuring device according to claim 6, in which said counter of said temperature output circuit is adapted to count output pulses of said pulse oscillator produced when said standard resistive element is connected thereto, and said time decision circuit comprises an additional counter adapted to count a given number of output pulses of said pulse oscillator produced when said temperature-sensitive resistive element is connected thereto, a reference oscillator, an up-down counter connected to said reference oscillator and adapted to count up from an initial value output pulses of said reference oscillator during the time interval in which said additional counter counts the given number of output pulses of said pulse oscillator and to count down output pulses of said reference oscillator to the initial value after completion of counting operation of said additional counter, and control means for causing said up-down counter to count up output pulses of said reference oscillator during the time interval in which said additional counter counts the given number of output pulses of said pulse oscillator produced when said temperature-sensitive resistive element is connected thereto, and causing said counter of said temperature output circuit to count, during the down-count operation of said up-down counter, output pulses of said pulse oscillator produced when said standard resistive element is connected thereto.

10. The electronic temperature measuring device according to claim 6, in which said pulse oscillator includes a first calibration resistor connected in series to said temperature-sensitive resistive element and a second calibration resistive element connected in series to both said temperature-sensitive resistive element and said standard resistive element.

11. The electronic temperature measuring device according to claim 6, in which said pulse oscillator includes a first calibration resistive element connected in series only to said standard resistive element and a second calibration resistive element connected in series to both said temperature-sensitive resistive element and said standard resistive element.

12. The electronic temperature measuring device according to claim 6 in which said pulse-oscillator includes an astable multivibrator.

13. The electronic temperature measuring device according to claim 12 in which said astable multivibrator includes serially connected first and second inverters.

14. An electronic temperature measuring device comprising:
 a pulse oscillator to which a temperature-sensitive resistive element and a temperature-insensitive standard resistive element are alternately coupled as a frequency determining element to produce first and second output pulses alternately;
 an up-down counter connected to said pulse oscillator; and
 means for causing said up-down counter to be counted up from a present value to a given value by said first output pulses of said pulse oscillator produced when said temperature-sensitive resistive element is coupled thereto and to be counted down from the given value, during the same time interval as the time interval required by said up-down counter to count said first output pulses, by said second output pulses of said pulse oscillator produced when said standard resistive element is coupled thereto.

15. The electronic temperature measuring device according to claim 14, in which said means comprises a reference oscillator, and an additional up-down counter connected to said reference oscillator and adapted to be counted up by output pulses of said reference oscillator when said temperature-sensitive element is coupled to said pulse oscillator and to be counted down by said output pulses of said reference oscillator when said standard resistive element is coupled to said pulse oscillator.

16. The electronic temperature measuring device according to claim 14, further comprising memory means for storing the maximum value of said up-down counter, and a digital display device connected to said memory means.

17. The electronic temperature measuring device according to claim 14, in which said pulse oscillator includes a first calibration resistor connected in series to said temperature-sensitive resistive element and a second calibration resistive element connected in series to both said temperature-sensitive resistive element and said standard resistive element.

18. The electronic temperature measuring device according to claim 14, in which said pulse oscillator includes a first calibration resistive element connected in series only to said standard resistive element and a second calibration resistive element connected in series to both said temperature-sensitive resistive element and said standard resistive element.

19. The electronic temperature measuring device according to claim 14 in which said pulse oscillator includes an astable multivibrator.

20. The electronic temperature measuring device according to claim 19 in which said astable multivibrator includes serially connected first and second inverters.

21. A temperature measuring device comprising:
 oscillator means to which a temperature-sensitive resistive element and a temperature-insensitive resistive element are alternately coupled as a frequency determining element to produce a temperature-dependent frequency and a temperature-independent frequency alternately;
 temperature output circuit means coupled to said oscillator means for providing a measured temperature value on the basis of a function of the ratio between the temperature-dependent frequency and the temperature-independent frequency produced by said oscillator means; and
 digital display means coupled to said temperature output circuit means for displaying the measured temperature value.

22. The temperature measuring device according to claim 21, in which said oscillator includes a first calibration resistor connected in series to said temperature-sensitive resistive element and a second calibration resistive element connected in series to both said temperature-sensitive resistive element and said standard resistive element.

23. The temperature measuring device according to claim 21, in which said oscillator includes a first calibration resistor connected in series only to said temperature-sensitive resistive element and a second calibration resistive element connected in series to both said temperature-sensitive resistive element and said standard resistive element.

24. The temperature measuring device according to claim 21 in which said oscillator means includes an astable multivibrator.

25. The temperature measuring device according to claim 24 in which said astable multivibrator includes serially connected first and second inverters.

* * * * *